(12) United States Patent
Rafac

(10) Patent No.: US 7,733,494 B2
(45) Date of Patent: Jun. 8, 2010

(54) BANDWIDTH MEASURING DEVICE FOR HIGH PULSE REPETITION RATE PULSED LASER

(75) Inventor: Robert J. Rafac, Carlsbad, CA (US)

(73) Assignee: Cymer, Inc., San Diego, CA (US)

( * ) Notice: Subject to any disclaimer, the term of this patent is extended or adjusted under 35 U.S.C. 154(b) by 138 days.

(21) Appl. No.: 11/394,513

(22) Filed: Mar. 31, 2006

(65) Prior Publication Data

US 2007/0229849 A1 Oct. 4, 2007

(51) Int. Cl.
*G01B 9/02* (2006.01)
(52) U.S. Cl. ...................... 356/454; 356/519
(58) Field of Classification Search ................ 356/328, 356/451, 454, 519; 372/32
See application file for complete search history.

(56) References Cited

U.S. PATENT DOCUMENTS

| | | | | |
|---|---|---|---|---|
| 4,975,919 A * | 12/1990 | Amada et al. | ................. | 372/32 |
| 5,243,614 A * | 9/1993 | Wakata et al. | ................. | 372/32 |
| 6,603,549 B2 | 8/2001 | Haas et al. | ................. | 356/326 |
| 6,713,770 B2 | 3/2004 | Sandstrom et al. | ......... | 250/372 |
| 6,894,785 B2 | 5/2005 | Rao et al. | ................... | 356/450 |
| 6,912,052 B2 | 6/2005 | Rao et al. | ................... | 356/451 |
| 6,952,267 B2 | 10/2005 | Rafac | ......................... | 356/454 |
| 2004/0263861 A1 | 2/2004 | Rafac et al. | ................ | 356/519 |
| 2004/0141182 A1 * | 7/2004 | Schroder et al. | ............ | 356/454 |
| 2004/0263844 A1 | 12/2004 | Rafac | ......................... | 356/519 |
| 2005/0007600 A1 * | 1/2005 | Rafac | ......................... | 356/519 |

OTHER PUBLICATIONS

Ben-Ezra, et al., "Jitter camera: high resolution video from a low resolution detector," *IEEE* (2004).
Wuttig, et al., "Subpixel analysis of a double array grating spectrometer," *Descour/Schen, Imaging Spectrometry VII*, Proc. SPIE, vol. 4480, pp. 34-344 (2002).
U.S. Appl. No. 11/091,005, filed Mar. 25, 2005, Newman et al.

* cited by examiner

*Primary Examiner*—Samuel A Turner

(57) ABSTRACT

A method and apparatus for estimating bandwidth of laser output light is described which may include a dispersive element producing a dispersed output having a plurality of spectrum images from at least a portion of the laser output light. An array of light detecting elements is oriented to receive the dispersed output together with a shifting mechanism that moves the array, the dispersed output, or both, relative to each other. Electronics may be provided for determining the widths of at least two spectrum images at different phases of registration between the spectrum images and light detector elements and for averaging the widths to estimate a laser output bandwidth. The-spectrum images formed by the laser output light may be under-sampled, e.g., in the spatial or time domains.

37 Claims, 6 Drawing Sheets

BANDWIDTH MEASURING DEVICE FOR HIGH PULSE REPETITION RATE PULSED LASER

CROSS-REFERENCE TO RELATED APPLICATIONS

The present application is related to U.S. patent applications Ser. No. 09/931,726, entitled CONVOLUTION METHOD FOR MEASURING LASER BANDWIDTH, filed on Aug. 16, 2001; Ser. No. 10/609,223, entitled METHOD AND APPARATUS FOR MEASURING BANDWIDTH OF AN OPTICAL OUTPUT OF A LASER, filed on Jun. 26, 2003; Ser. No. 10/789,328, entitled Improved Bandwidth Estimation, filed on Feb. 27, 2004; Ser. No. 11/091,005, entitled WAVEMETER FOR GAS DISCHARGE LASER, filed on Mar. 25, 2005; and U.S. Pat. No. 6,952,267, entitled METHOD AND APPARATUS FOR MEASURING BANDWIDTH OF A LASER OUTPUT, issued on Oct. 4, 2005; U.S. Pat. No. 6,912,052, entitled GAS DISCHARGE MOPA LASER SPECTRAL ANALYSIS MODULE, issued on Jun. 28, 2005; U.S. Pat. No. 6,894,785, entitled GAS DISCHARGE MOPA LASER SPECTRAL ANALYSIS MODULE, issued on May 17, 2005; U.S. Pat. No. 6,713,770, entitled HIGH RESOLUTION SPECTRAL MEASUREMENT DEVICE, issued on Mar. 30, 2004, the disclosures of which are hereby incorporated by reference.

FIELD OF THE INVENTION

The present invention relates to imaging spectrometers with a photo-detector array for measuring the bandwidth of the output of a laser system. The wavelength may also be measured by such a device.

BACKGROUND OF THE INVENTION

During a bandwidth-meter development project applicant's company determined that certain products (e.g., an ELS-7000 WSM wavemeter) has insufficient pixel sampling resolution when used at certain wavelengths. This insufficiency results in certain measurement errors, a root cause of which is an aliasing effect of the etalon spectrometer fringe image against the periodic grid of detector elements (e.g., a linear array of photodiodes). To reduce the level of certain measurement errors connected with undersampling of the spectrometer fringe image applicants propose certain modifications to wavemeter technology. Such wavemeter technology may be utilized, e.g., in measuring the spectral purity of line narrowed DUV laser system output laser light pulses, e.g., in excimer and/or molecular fluorine gas discharge lasers.

JenaOptik (Zeiss) uses a similar technique in their CCD cameras for microscopy (ProgRes products).

Ben-Esra, et al., "Jitter camera: high resolution video from a low resolution detector," IEE (2000) and Wuttig, et al., "Subpixel analysis of double array grating spectrometer," published in Descour/Schen, Imaging Spectrometry VII, Proc. SPIE, Vol. 4480 (2002) pp. 334-344 discuss aspects of image resolution techniques aspects of which may be useful according to aspects of embodiments of the present invention, the disclosures of which are hereby incorporated by reference.

To better understand aspects of the problems associated with under-sampling and aliasing in the present context, reference is made to FIG. 5. In FIG. 5a there is illustrated an example of a linear array 100 of photodiodes each representing an imaging pixel and a pixel in the output image of an example of a known center wavelength/bandwidth detector, such as those referenced in the patents and applications noted above. The pixels are labeled from convenience of reference X, x+1, x+2, x+3, x+4 and x+5. Assuming that an image of a light source represented by two square waves, A and B, as shown in FIG. 5b, of photonic energy are incident upon the array 100 so as to just illuminate two pixels x+2 and x+3, i.e., there is no spillover into the adjacent pixels x+1 on the left side or x+4 on the right side sufficient to register any detected intensity during some intensity sensing integration period. As shown in FIG. 5e the output of the detector using typical intensity sensing circuitry could be interpreted as the very same two square wave pulses 1 and 1' shown outlined by solid lines in FIG. 5e.

Turning to FIG. 5c, there is represented the same two square wave pulses A and B spatially phase shifted by about ½ a pixel width. In this event, the integrated intensity out of pixel x+2 will only be one half of what it was in the first example noted above, as illustrated in FIG. 5e by a dashed line defining an output 2. the output for pixel x+3 will remain the same, as indicated by the dashed line for output 2', and now pixel x+4 will have an output where it had none before, at a level of about ½ that of the output of pixel X+3. The output of the detector for such an input integrated by the photodiodes X+2, X+3 and X+4 in the linear array 100 could be interpreted as a saw tooth shaped image as denoted by the dashed line triangle in FIG. 5e.

Finally for an alignment as illustrated in FIG. 5d, the illumination of pixel x+2 is reduced to about 30% of what it was in the alignment of FIG. 5b and the illumination of pixel x+4 is about 70% of the illumination of the pixel x+3. These are represented by the dotted line outlines of the intensities for the pixels x+2 and x+5 and the dotted line triangle of FIG. 5e.

A similar version of these phenomena cause the differences in the outputs illustrated by way of examples in FIGS. 2 and 3. A very simplified version of the sampling of an interference fringe image of the type shown in FIGS. 2 and 3 is shown schematically for illustrative purposes in FIG. 6. FIG. 6 illustrates in a very simplified fashion the sampling of a fringe from an interference pattern in a typical known bandwidth detector. The representative pixels in a linear array of a photodetector are again labeled X through x+5 for convenience. As shown by way of illustration the points on the intensity curve for the fringe, e.g., points a, B and C, e.g., on one side of a peak of the intensity of the fringe pattern may be sampled by pixels X, x+1 and x+2. These may on average integrate an intensity that indicates approximately the respective points on the curve of the fringe peak.

Several problems with under-sampling are illustrated in FIG. 6 illustratively and schematically and not to scale. First, the max of the fringe peak may be determined to be either C or D, or both if they are equal in intensity which the real maximum is labeled MAX. Thus determining some threshold intensity bandwidth measurement, e.g., full width at 80% maximum ("FW80% M") may occur at the intensity value labeled FW80% M' in FIG. 6 because the real peak is not detected. further the error between where the real peak is and the detected peak can be seen to vary as the number of pixels in relation to the field covered by the image of the fringe increases.

Some prior art wavemeters have employed peak estimating algorithms, e.g., taking, by way of example the values for pixels x+1, x+2 and X+3, points B, C and D on the fringe curve and doing a parabolic estimate of the actual shape of the curve to derive something closer to the actual intensity maximum MAX, which, as illustrated can also be in error, e.g., being determined by such a parabolic estimation algorithm to be INT MAX. Further, as shown illustratively and schematically and not to scale, in FIG. 7, assuming the detector circuitry determines that INT MAX is very close to the actual MAX, the nature of the detector output reading with under-sampled spatial distribution of pixels in the linear array can result in an error in detecting the width at the selected threshold intensity. Typical known algorithms for determining the width at a selected FWX % M, e.g., FW80% M use an interpolation between sampled points on the fringe curve, e.g., points B and C. the interpolation may be linear, as shown in FIG. 7, in which event, wherever along the line between point B and point C where it is determined by the readout electronics that the threshold intensity occurs, e.g., 80% of the max, in addition to the possible errors cause by the limitations of the finite pixel array noted above, the point on the interpolation line is separated from the actual point on the curve by an error $\Delta FWXM$. As can be seen from the exemplary representation of FIG. 7, if the number of pixels is doubled (the pixel width halved) this error can be reduced, but still exists.

These errors can be exacerbated by the impact of the under-sampling using a finite pixel count and by movement of the image on the linear array grid of photodetectors, as noted above.

Some prior art wavemeters have employed more sophisticated interpolation algorithms, e.g., using a polynomial, e.g., $Ax^2 + bx$ to simulate the curve between the sampled points, e.g., B and C, to beer estimate the width of the fringe intensity curve at the point along the curve at which the threshold occurs, but even these are subject to errors of the type noted above.

To add to this, the width of the fringe intensity curves varies (gets narrower) at the extremities of the fringe pattern being sampled, so that, as shown by way of example in FIG. 8. applicants have found, s illustrated in FIG. 8 that, e.g., along a linear array of photodiodes used to sample the fringe intensities of a given fringe, the number of pixels illuminated decreases. Thus, the apparent bandwidth distance, e.g., at some threshold, e.g., FW20% M increases in the fringes closer to one extremity of the linear array 100. Applicants have also found that this trend is somewhat tolerable and can be determined for a given wavemeter and corrected for by subtracting an amount determined from the trend shown in FIG. 8 (some algorithms simulate the actual trend curve and some use a simple linear correction which in older system may have sufficed. However, even with such correction applicants have found that the above noted errors due in part to undersampling and tie resultant aliasing as well as some other adverse impacts some of which may not be fully appreciated or understood at this time by applicants cause the sever fluctuations in apparent fringe width shown by the lighter graphical representations in FIG. 8.

Applicants propose certain improvements to sampling and readout of fringe widths at the desired threshold values as noted below.

SUMMARY OF THE INVENTION

A method and apparatus is disclosed which may comprise detecting the bandwidth of laser output light pulses of a pulsed laser utilizing an array of light detecting elements by the steps which may comprise passing a portion of the laser output light produced by the pulsed laser to the array of light detecting elements in a manner that shifts the portion of the laser beam across the array of light detecting elements to avoid aliasing artifacts in output of the light detecting array. The portion of the image formed by the laser output light may be under-sampled, e.g., in the spatial or time domains. The relevant feature size of an image of an output of a fringe pattern generating element being sampled may comprise a size that is small with respect to the size of individual light detecting elements in the array of light detecting elements. The method and apparatus may further comprise the light detecting elements comprising a linear array of photo-detectors. The method and apparatus may comprise detecting the bandwidth of laser output laser light pulses of a pulsed laser utilizing an array of light detecting elements comprising using a dithered image registration to reduce aliasing artifacts in spectrometer measurements made of the laser output light. The method and apparatus for detecting the bandwidth of laser output light pulses may comprise a laser output light selector passing a portion of the laser output light into the apparatus; an array of light detecting elements; a shifting element shifting the portion of the laser output light to the array of light detecting elements in a manner that shifts the portion of the laser beam across the array of light detecting elements to avoid aliasing artifacts in output of the light detecting array. The method and apparatus may further comprise performing multiple measurements of a dispersed spectral image in a spectrometer in which said multiple measurements are taken at various phases of registration between the dispersed image and individual photodetector elements in a grid of photodetector elements in the spectrometer, and may also comprise averaging of the fringe width is applied to each of the multiple measurements. The method and apparatus may comprise the effect of the finite size of the photodetector elements being compensated by a polynomial model of the observed trend of the differential between actual and measured bandwidth. The apparatus and method may comprise an interpolative technique being used for the analysis of each image to obtain an estimate of the width of a fringe of the dispersed image prior to averaging. The interpolative technique may comprise interpolating near the peak of the fringe image to obtain a sub-pixel estimate of the position and peak intensity of the fringe image.

DETAILED DESCRIPTION OF PREFERRED EMBODIMENTS

According to aspects of an embodiment of the present invention, applicant proposes the use of a dithered image registration for reduction of aliasing artifacts in spectrometer measurements. Accordingly, applicant proposes the utilization of a method to move the image formed by the optics of a laser output light bandwidth and center wavelength measurement spectrometer back and forth across the grid of pixels that comprise a detector array of an imaging detector. This can be done for example by moving the detector back and forth across the stationary image, or by steering the image, e.g., with a movable mirror(s) as shown below. A tilting compensator or flat plate can also be interposed to similar effect.

Figure 2:
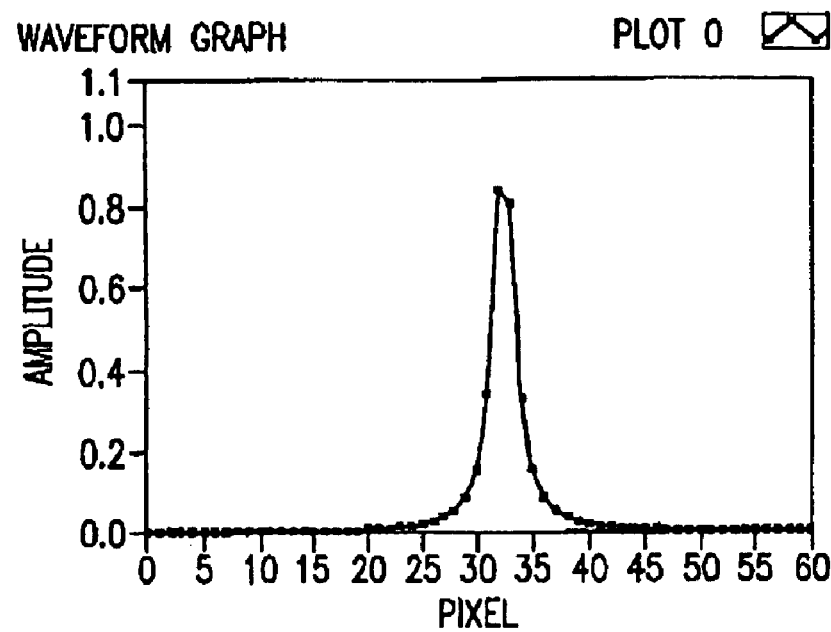
FIG. 2 illustrates graphically intensity levels on a pixel by pixel basis for an array of photo-detectors useful in understanding aspects of embodiments of the present invention.
Figure 3:
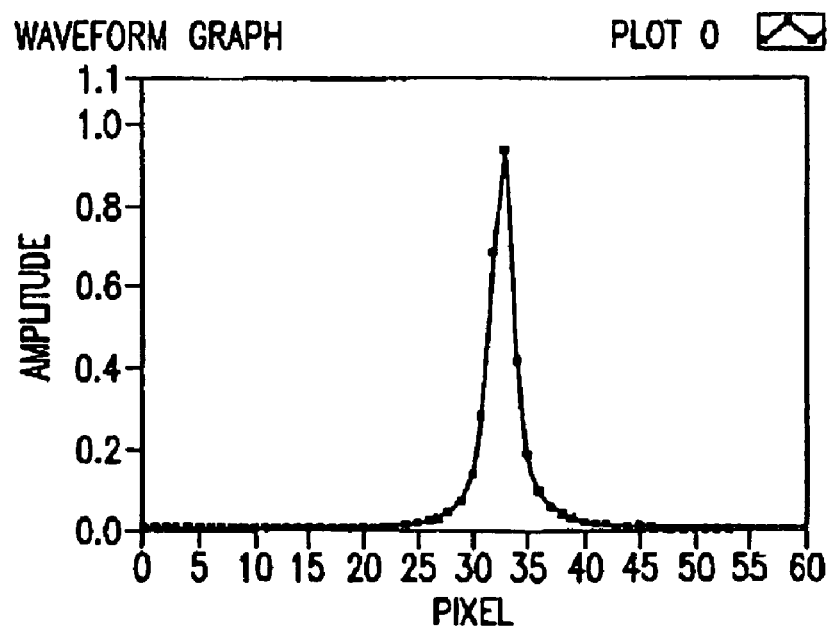
FIG. 3 illustrates graphically intensity levels on a pixel by pixel basis for an array of photo-detectors useful in understanding aspects of embodiments of the present invention.

Depending on where an image of the laser output light pulse spectrum falls on the grid of pixels, different shapes can be measured for the identical image, as illustrated in FIGS. 2 and 3. This is because, e.g., the pixels are large compared to the feature size of image that is being measured, e.g., a FWXM or an EX % bandwidth, i.e., the full width at some percentage of the max, e.g., full width half max ("FWHM") or the energy integral of some percentage of the energy in the spectrum on either side of the maximum, e.g., E95%. FIGS. 2 and 3 illustrate an exemplary image, e.g., with an identical fringe pattern projected onto an array, e.g., a linear array, grid of pixels, but, e.g., displaced by, ~½ of a pixel.

It can be seen that this effect can cause a kind of error in the apparent measured width of the image, e.g., because an algorithm processing the data to determine the FWXM and/or EX % width will receive different values for the intensity of the pixels in, e.g., the linear array, e.g., pixels 30-35 for the image of the spectrum projected onto the array of pixels, e.g., dependent upon the spatial distribution of the image on the pixel array, the size and pitch of the pixels in the array, etc. This spatial distribution of the image on the pixels can also oscillate with the position of the image on the array of the bandwidth detector. Because the position depends on, among other things, the operating wavelength in the dispersive optical element, e.g., the etalon, e.g., used to generate a fringe pattern from which the image of the spectrum can be created in the spectrometer, this oscillating error can appear to be a function of wavelength in spectrometers, such as are used for on-board center wavelength and bandwidth detection in, e.g., laser systems produced and marketed by applicant's assignee, Cymer, Inc., e.g., ELS 7XXX and XLA 1XXX, 2XXX and 3XXX model single and multi-chambered laser systems. It can also vary based on, e.g., etalon operating conditions, e.g., temperature, etc. and age. The period and magnitude of this oscillating error will also depend on the operating wavelength and bandwidth of the laser if the linear dispersion of the spectrometer varies across the detector array, e.g., in the case of an imaging etalon spectrometer. or other instrument with a short free-spectral range.

According to aspects of an embodiment of the present invention, applicant proposes that by changing the image registration (spatial phase) with the pixel grid periodically, (e.g., ≦about 1 pixel total displacement) mathematical techniques can be applied to recover information about the dispersed spot (e.g., etalon spectrometer fringe) that would otherwise be corrupted by the under-sampling. Applicant proposes a simplified technique which does not rely on detailed knowledge of the spatial phase (position) of each image, but, rather, using, e.g., multiple measurements with, e.g., sufficiently uniform distribution of phases across π radians (½ pixel). The applicant proposes that for purposes of determining a number which is linearly related to the true width of the image (e.g., the full-width at half-maximum of a spectrometer fringe) over a range of values of the sampling parameter. $P = v_{grid} / 2\ v_{image}$ (where $v_{image}$ is a characteristic cutoff of the image-frequency content and $1/v_{grid}$ is the spacing of the pixels on the detector array or grid), it is sufficient to calculate the apparent (e.g., under-sampled) width for, e.g., a plurality of different registrations distributed across π radians and form the average result. In addition, for each image registration an interpolation may be applied to better approximate a perfectly-resolved image, e.g., a parabolic interpolation of, e.g., three points with the highest intensity for purposes of approximating the peak magnitude with sub-pixel resolution, and linear interpolation of the points on either side of the width-measuring threshold (e.g. half-maximum) for purposes of approximating the width with sub-pixel resolution.

Figure 8:
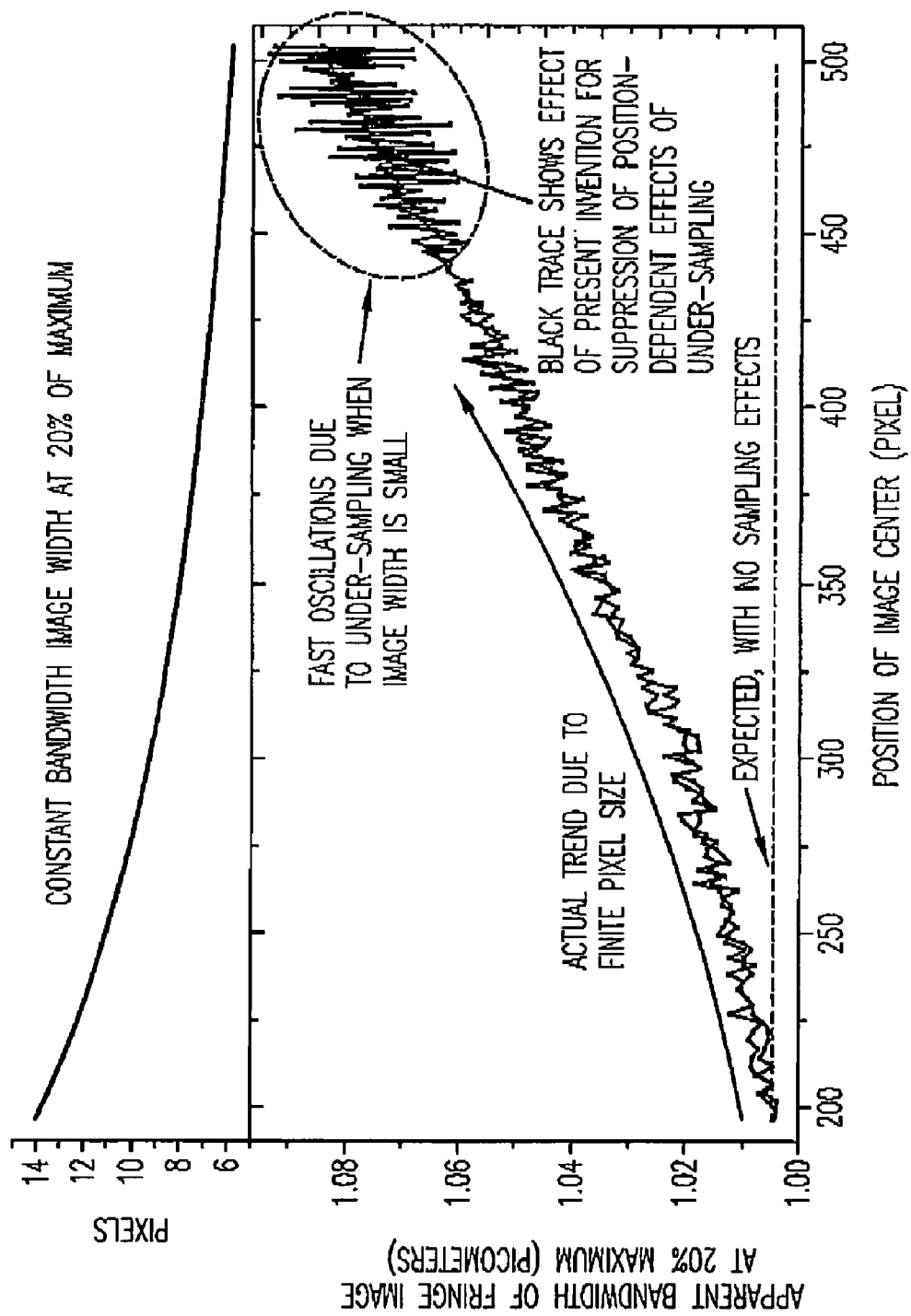

This process can, e.g., remove the sub-pixel position-dependent oscillations in the measured width. Depending on the value of the parameter P and the fill-factor of the detecting elements in the grid or linear array, a significant systematic but smooth and monotonic trend in the width as a function of position may remain, due to the spatial averaging over the finite pixel size. Applicant also proposes a technique for compensating this latter effect by modeling it with a polynomial function of image position, and using this model to correct the result, which is illustrated by way of example in FIG. 8, the beneficial effects of which are also illustrated by way of example in FIG. 4 wherein the polynomial model has been applied., for so-called blur correction. Even if the detection of the absolute value of the actual width is not significantly improved according to this aspect of an embodiment of the present invention, then the image variations can be measured with much greater resolution.

For example, from pulse to pulse, or within a burst of pulses, e.g., as is measured for utilizations of such laser systems as mentioned above as integrated circuit lithography DUV light sources or other applications where pulse to pulse and intra-burst pulse stability of output laser light pulse parameters, e.g., spectral purity, are of great significance to the requirements of effective operation, the image stability can be significantly improved such that the same stability in spectral purity can be attained. Thus, even if, e.g., offset slightly from the real laser quality parameter being measured, e.g., FWXM or EX %, the variation from this perhaps slightly inaccurate output light pulse parameter measurement, e.g., of spectral purity, pulse to pulse, or intra-burst, etc. can be much more precisely measured.

Systems utilizing the laser output light as a light source, e.g., in integrated circuit photolithography, may be much more readily able to adapt to the slight offset of the actual parameter measurement, e.g., spectral purity, output from, e.g., the wavemeter, than to variations in the stability of the measurement output, e.g., pulse to pulse or intra burst. Thus, the ability to significantly improve the stability of the laser output pulse parameter quality being measured, e.g., spectral purity, pulse to pulse and/or intra-burst can provide metrology for a far more stable control of the operation of, e.g., the laser system or the photolithography tool, e.g., a stepper or stepper-scanner or scanner, or both together, to meet ever more demanding requirements for, e.g., laser output pulse parameter quality, e.g., spectral purity during the operation of, e.g., the lithography tool.

Figure 1:
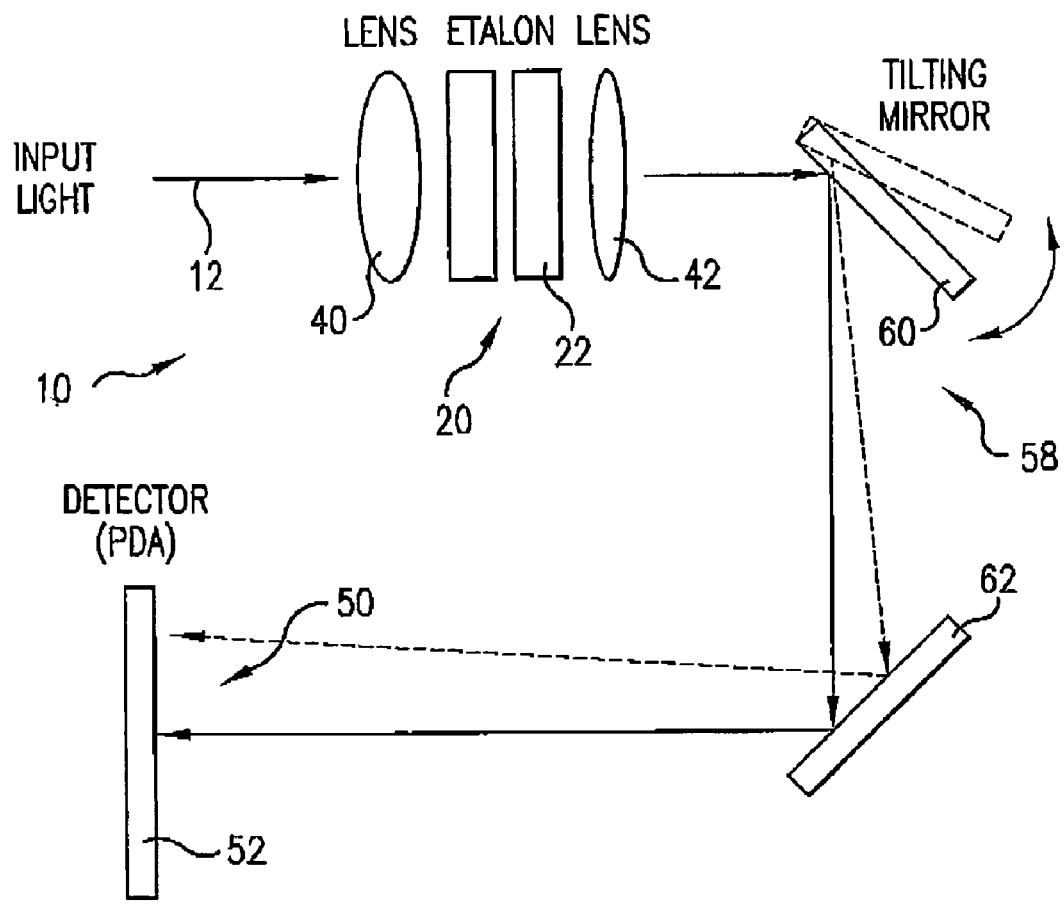
FIG. 1 shows schematically a wavemeter according to aspects of an embodiment of the present invention.

Turning now to FIG. 1 there is shown schematically aspects of an embodiment of the present invention. FIG. 1 illustrates schematically and by way of example a laser output pulse quality metrology tool 10, e.g., a wavemeter, e.g., utilized on an on-board center wavelength/bandwidth measurement subsystem for the types of lasers mentioned above utilized, e.g., in the kinds of application mentioned above, e.g., as discussed in co-pending patent applications mentioned above, assigned to the common owner of the present application, according to aspects of an embodiment of the present invention. The wavemeter 10 may receive a sample of the laser output light beam pulse 12, e.g., split off from the output of the laser system (not shown), e.g., exiting the laser system in a single chamber laser system or exiting either the master oscillator and/or an amplifying gain medium, e.g., a power amplifier/oscillator in a multiple chamber laser system, e.g., a MOPA or MOPO laser system.

This split off sample 12 of the laser output can form an input to the wavemeter 10. The wavementer 10 may also include an optical element 20, e.g., a dispersive optical element, e.g., comprising a transmissive dispersive etalon 22, e.g., for forming a fringe pattern as mentioned above. The optical element 20 may further comprise associated optics, e.g., lens 40 and lens 42, separately or cooperatively serving, e.g., to image the fringe pattern output of the etalon 22 onto an array 50 of light detectors 52, e.g., individual detectors 52 in a linear array 50, such as a linear array, e.g., with a linear photodiode array with 20 μm pixels on a 25 μm pitch and 0.5 mm height clocked up to the appropriate speed. The individual array detectors 52, e.g., photodiodes may integrate the intensity of photons striking the respective photodiode 52, each forming, e.g., a pixel in the, e.g., linear array 50. Such measurements integrated over some time, as is well understood in the art, may form an intensity pattern a portion of which is illustrated byway of example in FIGS. 2 and 3.

A mechanism 58 for, e.g., scanning the image across the pixels 52 of the array 50, e.g., a tilting mirror 60, e.g., in conjunction with a turning mirror 62, may serve to provide, e.g., the time and spatial averaging of the image forming, e.g., the fringe pattern on the photodiodes 52 of the array 50, as one exemplary apparatus and method of providing the advantages noted above. according to aspects of an embodiment of the present invention the mirror 60 may be mounted on a machined flexure (hinge) and tilted using a PZT actuator (not shown) to push on the back of the mirror 60 opposite the flexure (or alternatively the mirror 60 may be mounted on a pivot point (not shown) which may be positioned toward one end of the longitudinal extent of the mirror 60). Thus the mirror may be pivoted on the axis of the pivot point or hinged flexure producing the motion in the direction of the arrows in the plane of the page as shown in FIG. 1. The actuator for the PZT element (not shown) may be, e.g., free-running. It may be supplied with a ramp waveform, e.g., to scan the length of the PZT and hence tilt the angle of the mirror uniformly. The displacement (PZT voltage) and frequency of scanning may be chosen, e.g., so as to cover more than $\pi$ radians of spatial phase at least once during the averaging time, i.e., the time during which the photodiodes in, e.g., the linear array, are integrating incident photons to provide a sampled intensity for each pixel in the array.

According to aspects of an embodiment of the present invention the scanning of the image of the fringe may be done, e.g., at a rate to shift the image by in one half of pixel up to e.g., one and one half of a pixel, e.g., in an embodiment one pixel, in increments of a fraction of a pixel, e.g., $1/64^{th}$ of a pixel, e.g., for each pulse of laser light over some sampling window, e.g., 64 pulses, before, e.g., scanning back in the opposite direction, e.g., with the same increments. This may be done, e.g., for a laser operating at 4 kHz one step every 250 ms, and the sample window may be, e.g., 64 samples in each direction. The currently used detection of intensities at each pixel in the array and the interpolations and other signal processing algorithms performed to get a bandwidth output as is currently done on wavemeters on laser systems s such as those noted above which do not employ differing image registrations may be done according to aspects of an embodiment of the present invention. Using the sample time, e.g., 64 different registrations, as a rolling sample window, after the first sample window then the system can continue to update the averaging over the latest, e.g., 64 registrations on, e.g., a pulse by pulse basis using the prior 63 registration outputs for averaging over the new 64 registration window. The system may reset between bursts of pulses, e.g., used to illuminate one die or a portion of one die in an illumination window on a lithography scanner and thus provide the refined bandwidth readout only after the initial 64 laser pulses in the burst, or may retain the averaged value for the previous burst to the next to average registrations in the next burst from the outset. In addition the system may start afresh after a series of bursts, e.g., illuminating an entire wafer in a photolithography process and only reset after a delay longer than the intra-burst delay, e.g., as wafers are changed, or when a new batch of wafers is loaded into the scanner of after some other selected longer delay in laser firing. It will be also understood that other registrations can be used besides 64 and scanning speeds can be increased or decreased such that, depending on laser pulse repetition rate among other things, the scanning can occur up and back on the array one or more times in the exemplary 64 registrations sample window. Averaging, e.g., over every or at least a vide variety of possible sampling phase can serve, e.g., to prevent variations that occur due to changes in the sampling phase in regular operation of the existing art, e.g., due to a shift in fringe position, e.g., due to wavelength change or other causes resulting in the change in sampling phase.

It will be understood that undersampling of the signal output from the fringe pattern creating optical element, e.g., the etalon 22, e.g., in the spatial domain, i.e., due to the relationship between the size of the image of the fringe pattern, e.g., its width, in regard to the size and/or pitch of the photo-diodes 52, can result in aliasing of the output signal from the photo-detector array. Aspects of an embodiment of the present invention can also serve to substantially eliminate detrimental effects of such aliasing. For example, the imaged fringe pattern may be imaged in width over, e.g., about five or six pixels as illustrated by way of example in FIGS. 2 and 3, an corresponding to an actual bandwidth on the order of tenths of picometers. Aspects of an embodiment of the present invention may also extend into the time domain vis-a-vis the portion of the laser light beam shifted across, e.g., a single pixel being sampled periodically, e.g., every 10 picoseconds, e.g., when such a scan as is large with respect to the feature size of the image being built up by the scan, e.g., where the feature size has a characteristic in relation to the resolution for the pixel in the time domain (the interval between reading and resetting the single pixel, over which some portion of the image is integrated before being read at the next sample time. This characteristic relationship may, e.g., change with the change in the fringe pattern, e.g., on the order of the temporal size of the pixel, with the desired number of pixel scans being about three over a particular feature that is trying to be resolved. This effect in the time domain is very similar to the spatial scanning of a linear array.

Figure 4:
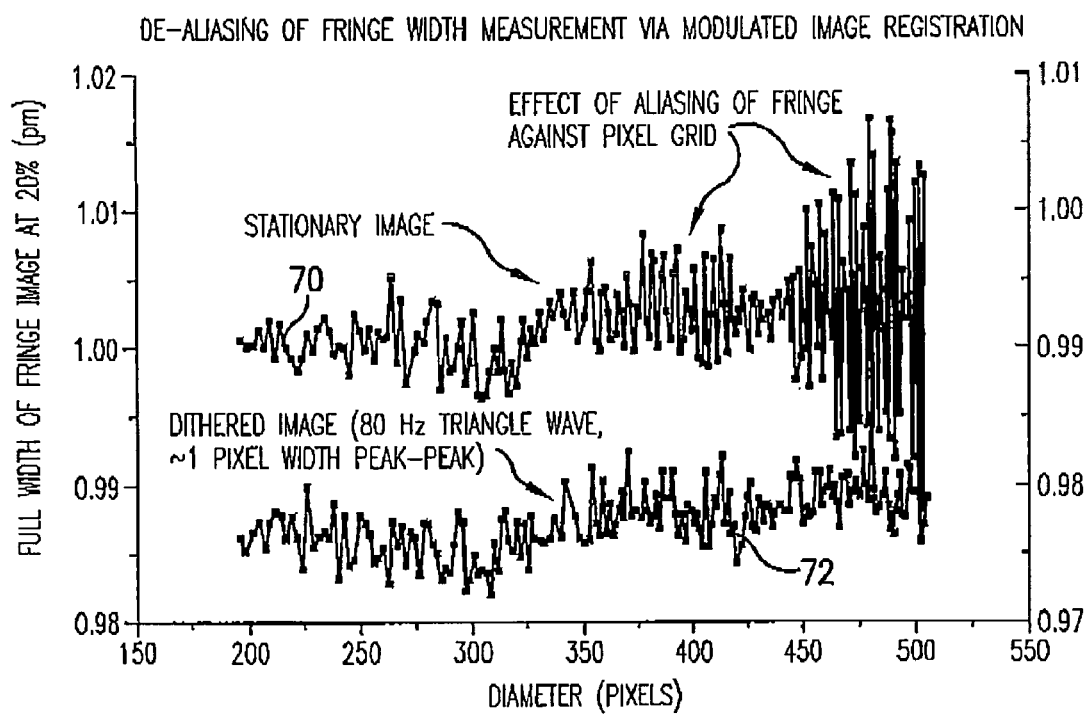
FIG. 4 illustrates graphically benefits of utilizing an apparatus and method according to aspects of an embodiment of the present invention.
Figure 5:
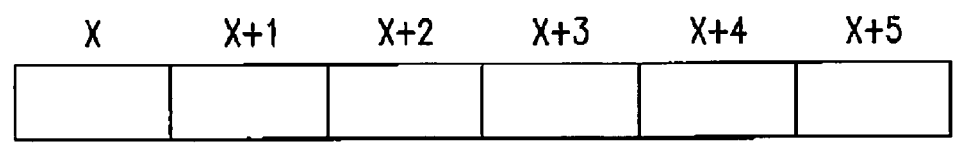
FIG. 5 illustrates schematically and not to scale problems associated with under-sampling of an intensity image with a finite number of pixels in a pixel grid.
Figure 5:
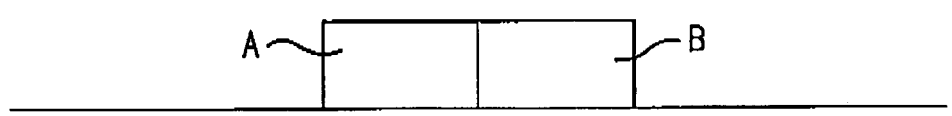
Figure 5:
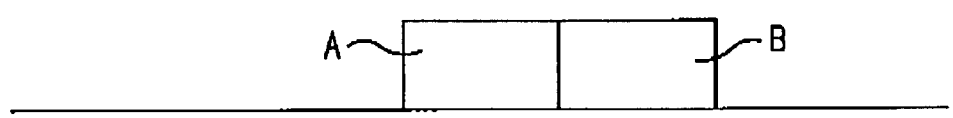
Figure 5:
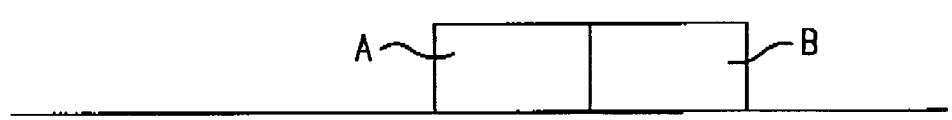
Figure 5:
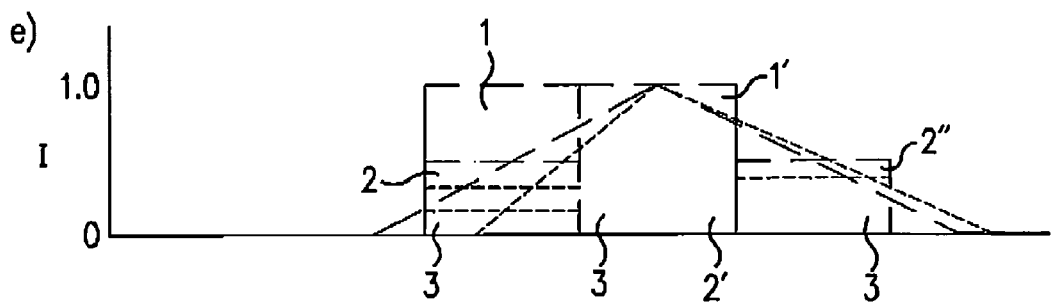
Figure 6:
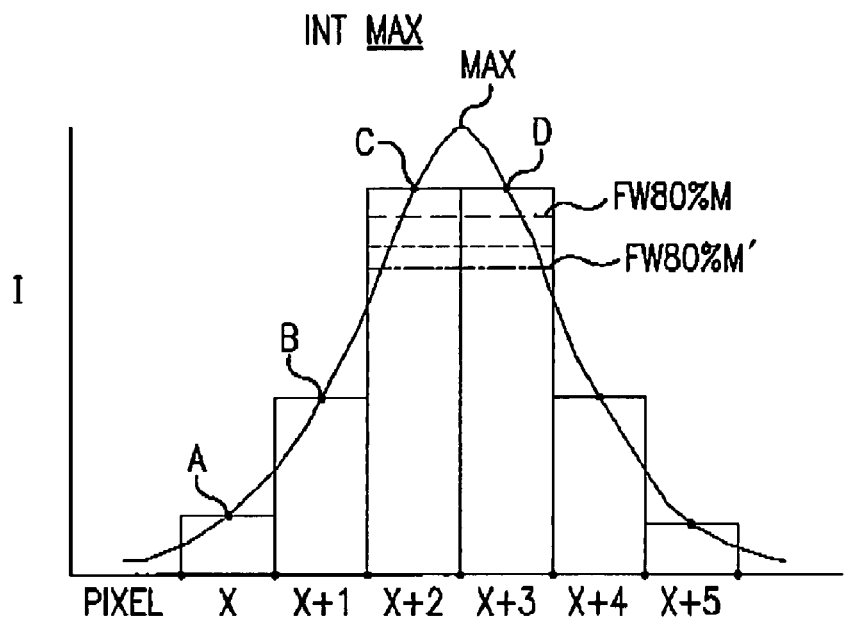
FIG. 6 illustrates schematically and not to scale problems associated with under-sampling of an intensity image with a finite number of pixels in a pixel grid.
Figure 7:
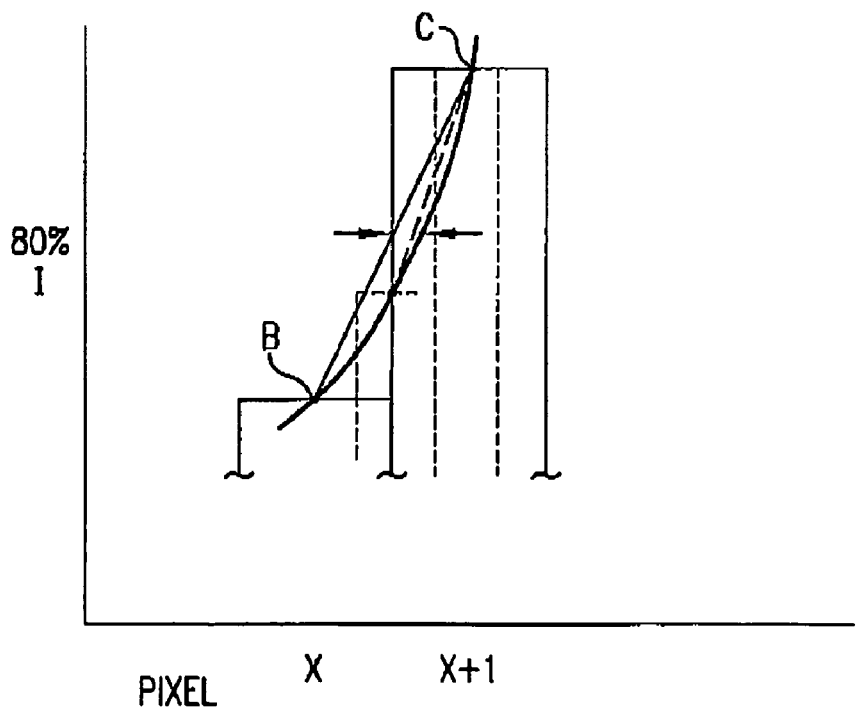
FIG. 7 illustrates schematically and not to scale problems associated with under-sampling of an intensity image with a finite number of pixels in a pixel grid; and, FIG. 8 illustrates schematically and not to scale problems associated with under-sampling of an intensity image with a finite number of pixels in a pixel grid.

FIG. 4 illustrates some experimental data demonstrating that this motion of the image over the detector array, e.g., the linear array 50 of photodiodes 52 and the resultant, e.g., averaging of the width values can serve to suppress the error term, e.g., that oscillates with position and with time in the operation of existing such on-board spectrometers and the like. Plot 70 in FIG. 4, as measured on the scale on the left of the chart, shows the behavior of the measured width of the detector 10 output image without the modulation of the image registration. The fast oscillations in the data for a diameter (i.e., position on PDA 50) greater than about 450 are an example of the effect that is desirable to be removed. Plot 72, as measured on the scale at the right of the chart, shows what can happen, e.g., when one modulates the image position, e.g., ± about ½ and take the average of many measurements of the spectral purity width being utilized. The adverse effect shown in plot 70 can, e.g., be essentially completely suppressed, and all that remains are other error sources.

It will be understood by those skilled in the art from the above that an apparatus and method for detecting the bandwidth of laser output light pulses of a pulsed laser utilizing an array of light detecting elements is disclosed which may comprise passing a portion of the laser output light produced by the pulsed laser, e.g., with a beam splitter, to the array of light detecting elements in a manner that shifts the portion of the laser beam across the array of light detecting elements to avoid aliasing artifacts in output of the light detecting array. That is, in a manner that, e.g., averages the positioning of the image, e.g., of a fringe pattern producing element, e.g., an etalon, over the array, e.g., a linear array of photo-diodes, which may serve, among other things, to avoid aliasing problems with detecting and measuring an aspect of the imaged fringe pattern, e.g., its bandwidth. The portion of the laser output light may be under-sampled, e.g., in the spatial domain, e.g., because the size of the parameter being measured, e.g., bandwidth, is small, e.g., with respect to the size of individual pixels in the array. For example, the image may extend over only several pixels, e.g., up to around five or six. The pulsed laser may comprise an excimer or molecular fluorine gas discharge laser, e.g., operating at 3500 hertz or above, e.g., up to and above about 6000 Hz, but also applicable down to as low as about 200 Hz, and the invention may be especially useful, e.g., where the bandwidth being measured is, e.g., an E95 value and the stability of measurement from pulse to pulse may be of significance. The light detecting elements may also comprise a linear array of photo-detectors. The method and apparatus may comprise using a dithered image registration to reduce aliasing artifacts in spectrometer measurements made of the laser output light, that is to say, modulated image registration vis-a-vis the individual detector elements sufficiently to substantially eliminate aliasing effects on the output of the detector.

It will also be understood by those in the art that what has been disclosed is a method and apparatus for suppressing systematic errors in estimating the bandwidth of a laser light source such as those of the type noted above which may comprise performing multiple measurements of a dispersed spectral image in a spectrometer in which said multiple measurements are taken at various phases of registration between the dispersed image and individual photodetector elements in a grid of photodetector elements in the spectrometer (or in a single photodetector registered in the time domain over an image), which may occur during a sampling period, e.g., between pulses in a burst of pulses of laser output light from such a laser light source system. The method and apparatus may further comprise averaging of the fringe width as applied to each of the multiple measurements. The method and apparatus may further comprise the effect of the finite size of the photodetector elements being compensated by a polynomial model of the observed trend of the differential between actual and measured bandwidth. The method and apparatus may further comprise an interpolative technique being used for the analysis of each image to obtain an estimate of the width of a fringe of the dispersed image prior to averaging. The interpolative technique may comprise interpolating near the peak of the fringe image to obtain a sub-pixel estimate of the position and peak intensity of the fringe image, e.g., using pixel sample values on either side of a peak for the sampled fringe, or may comprise, interpolating near the width-measuring threshold to obtain a sub-pixel estimate of the full-width of the image at some threshold of the peak intensity, e.g., using pixel sample values on either side of a threshold intensity value such as FW80% M, FWHM or FW20% M or the like.

Also those in the art will understand that a method and apparatus is disclosed which may comprise detecting the bandwidth of laser output light pulses of a pulsed laser utilizing an array of light detecting elements by the steps which may comprise passing a portion of the laser output light produced by the pulsed laser to the array of light detecting elements in a manner that shifts the portion of the laser beam across the array of light detecting elements to avoid aliasing artifacts in output of the light detecting array. The portion of the image formed by the laser output light may be under-sampled, e.g., in the spatial or time domains and may include a relevant feature size of an image of an output of a fringe pattern generating element being sampled, e.g., a spectral width, which may comprise a size that is small with respect to the size of individual light detecting elements in the array of light detecting elements (or with respect to the sampling duration in an embodiment with a single detector scanning the image over a plurality of time intervals. The method and apparatus may further comprise the light detecting elements comprising a linear array of photo-detectors. The method and apparatus may comprise detecting the bandwidth of laser output laser light pulses of a pulsed laser utilizing an array of light detecting elements comprising using a dithered image registration to reduce aliasing artifacts in spectrometer measurements made of the laser output light. The method and apparatus for detecting the bandwidth of laser output light pulses may comprise a laser output light selector passing a portion of the laser output light into the apparatus; an array of light detecting elements; a shifting element shifting the portion of the laser output light to the array of light detecting elements in a manner that shifts the portion of the laser beam across the array of light detecting elements to avoid aliasing artifacts in output of the light detecting array. The method and apparatus may further comprise performing multiple measurements of a dispersed spectral image in a spectrometer in which said multiple measurements are taken at various phases of registration between the dispersed image and individual photodetector elements in a grid of photodetector elements in the spectrometer, and may also comprise averaging of the fringe width is applied to each of the multiple measurements. The method and apparatus may comprise the effect of the finite size of the photodetector elements being compensated by a polynomial model of the observed trend of the differential between actual and measured bandwidth. The apparatus and method may comprise an interpolative technique being used for the analysis of each image to obtain an estimate of the width of a fringe of the dispersed image prior to averaging. The interpolative technique may comprise interpolating near the peak of the fringe image to obtain a sub-pixel estimate of the position and peak intensity of the fringe image.

While the particular aspects of embodiment(s) of the WAVEMETER FOR HIGH PULSE REPETITION RATE PULSED LASER described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present WAVEMETER FOR HIGH PULSE REPETITION RATE PULSED LASER is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. In additions to changes and modifications to the disclosed and claimed aspects of embodiments of the present invention(s) noted above others could be implemented. For example, another scanning mechanism may be employed, e.g., an actuatable optical element, e.g., an acousto-optical, electro-optical or magneto-optical element that, e.g., changes its refractive index and coefficient of refraction when stimulated, respectively by an acoustic, electric or magnetic field by an amount determined by the level of excitation to thus scan the beam across the array of photodetectors.

I claim:

1. A method for estimating bandwidth of laser output light comprising:
   passing at least a portion of the laser output light to a spectrometer to produce a plurality of spectrum images representative of the output light spectrum;
   directing the spectrum images to an array of light detecting elements;
   determining widths of at least two spectrum images at different phases of registration between the spectrum images and light detector elements; and
   averaging the widths to estimate a laser output bandwidth.

2. The method of claim 1 further comprising:
   wherein the widths are under-sampled by the array of detector elements.

3. The method of claim 1 further comprising:
   wherein the widths are under-sampled in the spatial domain by the array of detector elements.

4. The method of claim 2 further comprising:
   wherein the widths are under-sampled in the time domain by the array of detector elements.

5. The method of claim 1 further comprising:
   wherein the spectrometer comprises an etalon and imaging optic producing a fringe pattern having a fringe width.

6. The method of claim 2 further comprising:
   wherein the spectrometer comprises an etalon and imaging optic producing fringe pattern having a fringe width.

7. The method of claim 3 further comprising:
   wherein the spectrometer comprises an etalon and imaging optic producing a fringe pattern having a fringe width.

8. The method of claim 4 further comprising:
   wherein the spectrometer comprises an etalon and imaging optic producing a fringe pattern having a fringe width.

9. The method of claim 5 further comprising:
   the light detecting elements comprise a linear array of photo-detectors.

10. The method of claim 6 further comprising:
    the light detecting elements comprise a linear array of photo-detectors.

11. The method of claim 7 further comprising:
    the light detecting elements comprise a linear array of photo-detectors.

12. The method of claim 8 further comprising:
    the light detecting elements comprise a linear array of photo-detectors.

13. A device for estimating bandwidth of laser output light comprising:
    means for producing a plurality of spectrum images from at least a portion of the laser output light;
    means for directing the spectrum images to an array of light detecting elements;
    means for determining widths of at least two spectrum images at different phases of registration between the spectrum images and light detector elements; and
    means for averaging the widths to estimate a laser output bandwidth.

14. The device of claim 13 further comprising:
    wherein the widths are under-sampled by the array of detector elements.

15. The device of claim 13 further comprising:
    wherein the widths are under-sampled in the spatial domain by the array of detector elements.

16. The device of claim 13 further comprising:
    wherein the widths are under-sampled in the time domain by the array of detector elements.

17. The device of claim 13 further comprising:
wherein the means for producing a plurality of spectrum images comprises an etalon and imaging optic producing a fringe pattern having a fringe width.

18. The device of claim 14 further comprising:
wherein the means for producing a plurality of spectrum images comprises an etalon and imaging optic producing a fringe pattern having a fringe width.

19. The device of claim 15 further comprising:
wherein the means for producing a plurality of spectrum images comprises an etalon and imaging optic producing-a fringe pattern having a fringe width.

20. The device of claim 16 further comprising:
wherein the means for producing a plurality of spectrum images comprises an etalon and imaging optic producing a fringe pattern having a fringe width.

21. The device of claim 17 further comprising:
the light detecting elements comprise a linear array of photo-detectors.

22. The device of claim 18 further comprising:
the light detecting elements comprise a linear array of photo-detectors.

23. The device of claim 19 further comprising:
the light detecting elements comprise a linear array of photo-detectors.

24. The device of claim 20 further comprising:
the light detecting elements comprise a linear array of photo-detectors.

25. A device for estimating bandwidth of laser output light comprising:
An optical element producing a dispersed output having a plurality of spectrum images from at least a portion of the laser output light;
an array of light detecting elements receiving the dispersed output;
a shifting mechanism moving at least one of the array and the dispersed output relative to the other; and
electronics determining widths of at least two spectrum images at different phases of registration between the spectrum Images and light detector elements and averaging the widths to estimate a laser output bandwidth.

26. The device of claim 25 further comprising:
wherein the optical element comprises an etalon and an imaging optic.

27. The device of claim 25 further comprising:
wherein the shifting mechanism includes a tilting mirror.

28. The device of claim 25 further comprising:
wherein the widths are under-sampled by the array of detector elements.

29. The device of claim 25 further comprising:
wherein the widths are under-sampled in the spatial domain by the array of detector elements.

30. The device of claim 25 further comprising:
wherein the widths are under-sampled in the time domain by the array of detector elements.

31. The device of claim 25 further comprising:
wherein each said width is a measurement of the wavelength interval containing a selected energy percentage of the respective spectrum image.

32. The device of claim 31 further comprising:
wherein the selected energy percentage is ninety-five percent.

33. The device of claim 25 further comprising:
wherein each spectrum image has a maximum intensity and each said width is a measurement of the full width of the respective spectrum image at a selected intensity percentage of the maximum intensity.

34. The device of claim 33 further comprising:
wherein the selected energy percentage is fifty percent.

35. The method of claim 1 further comprising:
wherein each said width is a measurement of the wavelength interval containing a selected energy percentage of the respective spectrum image.

36. The method of claim 1 further comprising:
wherein the selected energy percentage is ninety-five percent.

37. The method of claim 1 further comprising:
wherein each spectrum image has a maximum intensity and each said width is a measurement of the full width of the respective spectrum image at a selected intensity percentage of the maximum intensity.

* * * * *